(12) United States Patent
Bycroft et al.

(10) Patent No.: US 12,225,297 B2
(45) Date of Patent: Feb. 11, 2025

(54) ZONED ANTI-GLINT FILTER FOR CAMERAS IN HIGH CONSEQUENCE ENVIRONMENTS

(71) Applicant: The Aerospace Corporation, El Segundo, CA (US)

(72) Inventors: Benjamen P. Bycroft, Los Angeles, CA (US); Donald Wayne Denham, Arlington, VA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 18/055,328

(22) Filed: Nov. 14, 2022

(65) Prior Publication Data
US 2024/0163565 A1    May 16, 2024

(51) Int. Cl.
*H04N 23/72* (2023.01)
*H04N 23/71* (2023.01)

(52) U.S. Cl.
CPC ............. *H04N 23/72* (2023.01); *H04N 23/71* (2023.01)

(58) Field of Classification Search
CPC .............................. H04N 23/72; H04N 23/71
See application file for complete search history.

(56) References Cited

U.S. PATENT DOCUMENTS

| | | | |
|---|---|---|---|
| 11,580,623 B1* | 2/2023 | Steinberger | G06V 10/56 |
| 2006/0008116 A1* | 1/2006 | Kiraly | G06T 7/20 |
| | | | 382/103 |
| 2009/0091750 A1* | 4/2009 | Urano | G01N 21/94 |
| | | | 356/237.3 |
| 2013/0342753 A1* | 12/2013 | Kitagawa | H04N 23/80 |
| | | | 348/349 |
| 2016/0316163 A1* | 10/2016 | Beck | H04N 25/59 |
| 2017/0013248 A1* | 1/2017 | Sato | G06T 5/003 |
| 2017/0302858 A1* | 10/2017 | Porter | H04N 23/71 |
| 2017/0318232 A1* | 11/2017 | Yu | G06T 7/0002 |
| 2019/0041559 A1* | 2/2019 | Higashitani | H04N 23/12 |
| 2023/0196794 A1* | 6/2023 | Chung | G06V 10/25 |
| | | | 382/103 |

* cited by examiner

*Primary Examiner* — James M Hannett
*Assistant Examiner* — Fayez A Bhuiyan
(74) *Attorney, Agent, or Firm* — LeonardPatel PC

(57) ABSTRACT

Zoned anti-glint filtering includes identifying one or more pixels impacted or predicted to be impacted by glint in a captured image, and adjusting the one or more pixels to capture an image with those zones dimmed to mitigate impacts from glint. Knowledge of the applied anti-glint filter may be used in post-processing to reconstruct an image without adverse impacts from glint or the anti-glint filtering process.

21 Claims, 10 Drawing Sheets

800

ZONED ANTI-GLINT FILTER FOR CAMERAS IN HIGH CONSEQUENCE ENVIRONMENTS

FIELD

The present invention relates to anti-glint filtering, and more particularly, to a system and method for anti-glint filtering for space-based digital cameras.

BACKGROUND

It appears that current camera arrays have a singular gain and/or exposure setting for the entire image sensor array, which limits the ability to mitigate the effects of glint and blooming.

The current state of the art uses a single gain value for the entire pixel array. This can cause the array gain to be lowered when a bright spot in the incoming image saturates a small portion of the array, which reduces quality of the image produced outside of the bright spot.

FIG. 1 is a flow diagram illustrating a conventional process 100 for attempting to remove glint in an image. In the conventional process 100, an image is taken at 105, and at 110, a new image is taken with signs of glint onset. At 115, a conventional auto-exposure mechanism adjusts exposure and/or integration for the entire image field. This results in an image, which is unusable due to poor signal/noise. Other methods may keep the exposure static, allowing the glint to grow. This also results in an image, which is unusable due to a region obscured by glint.

Accordingly, an improved approach for mitigating glint in a zone manner, such that impacts from glint are contained to a subset of the total image, and further may be performed algorithmically to reconstruct an improved image capture may be beneficial.

SUMMARY

Certain embodiments of the present invention may provide solutions to the problems and needs in the art that have not yet been fully identified, appreciated, or solved by current anti-glint filtering technologies. For example, some embodiments of the present invention pertain to a system and method for per-pixel anti-glint filter for space-based digital cameras. In a similar embodiment, a system and method for zoned anti-glint filtering for digital cameras is used for autonomous vehicles in ground, sea, air, space, or other applications.

In an embodiment, a method for pixel based anti-glint filtering includes identifying one or more dimmed pixels in a captured image, and adjusting the one or more dimmed pixels to capture a non-dimmed image.

In another embodiment, a non-transitory computer-readable medium includes a computer program for pixel based anti-glint filtering. The computer program is configured to cause at least one processor to execute identifying one or more dimmed pixels in a captured image, and adjusting the one or more dimmed pixels to capture a non-dimmed image.

In yet another embodiment, a system configured to perform pixel based anti-glint filtering includes at least one processor and memory comprising a set of instructions. The set of instructions is configured to cause at least one processor to execute identifying one or more dimmed pixels in a captured image, and adjusting the one or more dimmed pixels to capture a non-dimmed image.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments generally pertain to a system and method for per-pixel anti-glint filtering for space-based digital cameras. Sometimes, during the light gathering process of a digital image, some pixels become saturated by a glint or bloom from within the image field of view (FOV). The system/method may block the light from the pixels, preventing the saturation of the pixels, or in other ways, prevent the image sensor's exposure or automatic gain controller from adjusting the gain for the entire image so that areas outside the glint or bloom lose data. This may be performed by way of a per-pixel filtering. For purposes of explanation, per-pixel filtering shades a portion of the pixel array, thereby limiting the electrical charge collected by the shaded pixels to maintain the pixel's electrical output in the dynamic range and avoid pixel saturation, or individually adjusting the pixel output gain for each pixel or groups of pixels to maintain the pixel output in the dynamic range and avoid pixel saturation. A final image may be reconstructed by processing the per-pixel filtered image to capture a more complete image product. The final image construction process may be performed with a single image and knowledge of the applied per-pixel filter, and/or with the inclusion of previous and future images captured with different or no per-pixel filtering.

In some embodiments, a pre-optics filter may be placed on top or in front of the lens. In some further embodiments, the pre-optics filter may be attached to the lens. This pre-optics filter may have zoned dimming, i.e., with the pre-optics filter, dimming may be performed for either a group of pixels or individual pixels. Put simply, zones on the imaging sensor may be selected and regions containing the glint are adjusted or dimmed. This way, when glint is detected on an image, the glint does not cause the entire image to be over or under exposed due to the zoned dimming.

Also, in some embodiments, zones may be selected algorithmically. For example, the algorithm may trend regions of the image to detect spikes or other indicators of glint onset in certain regions. When glint onset is detected, dimming is applied to that specific region.

Figure 1:
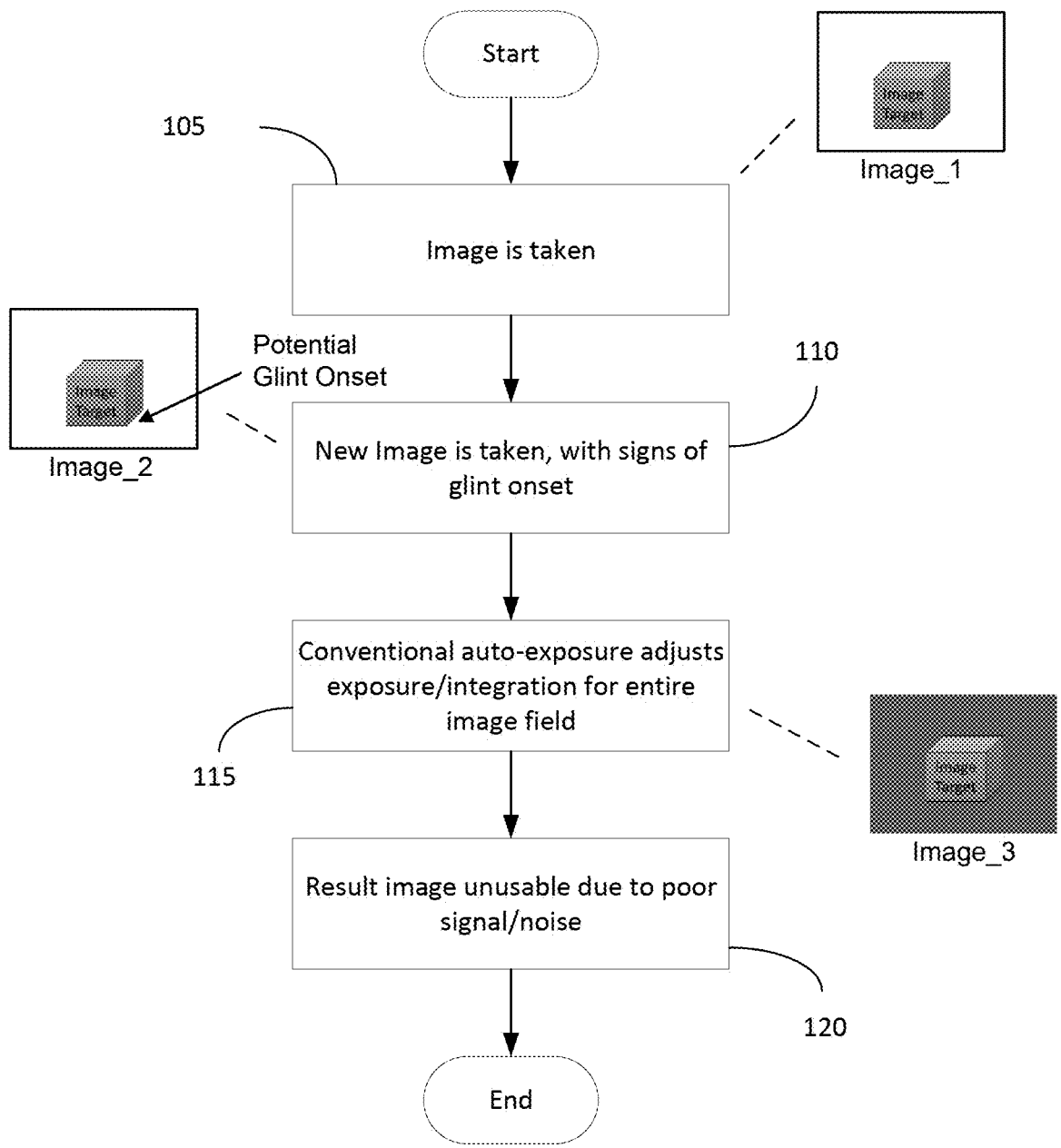
FIG. 1 is a flow diagram illustrating a conventional process for attempting to remove glint in an image.
Figure 2:
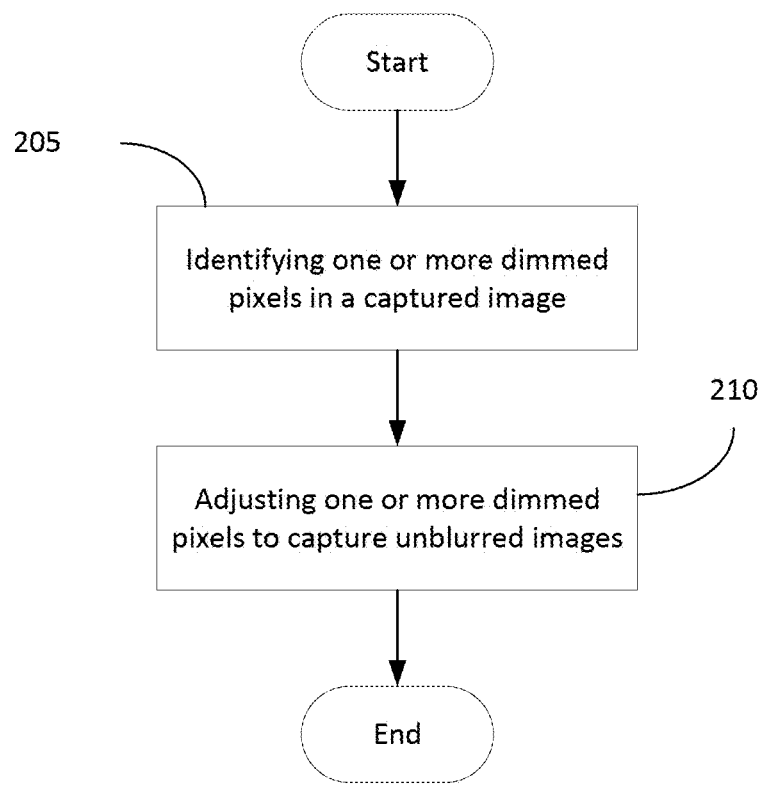
FIG. 2 is a flow diagram illustrating a method for pixel based anti-glint filtering, according to an embodiment of the present invention.

FIG. 2 is a flow diagram illustrating a method 200 for pixel based anti-glint filtering, according to an embodiment of the present invention. In some embodiments, method 200 includes, at 205, identifying one or more dimmed pixels in a captured image. Dimmed, for purposes of explanation, may be defined as pixels impacted by local overexposure or glint whose outputs have been reduced. Method 200 also includes, at 210, adjusting the one or more dimmed pixels to capture a non-dimmed (or unblurred) image.

In certain embodiments, the adjusting of one or more dimmed pixels includes performing per-pixel or even sub-pixel filtering, such that a portion of the pixel array is shaded. The adjusting may also include limiting of a charge collected from the one or more dimmed pixel and/or individually adjusting the gain for the one or more dimmed pixels.

In some embodiments, the method may include reconstructing a final image by processing the captured image to generate the non-dimmed image. For example, the reconstructing of the final image is performed with a single image and knowledge of an applied per-pixel filter, and/or with an inclusion of previous and future images captured with different or no per-pixel filtering.

Figure 3:
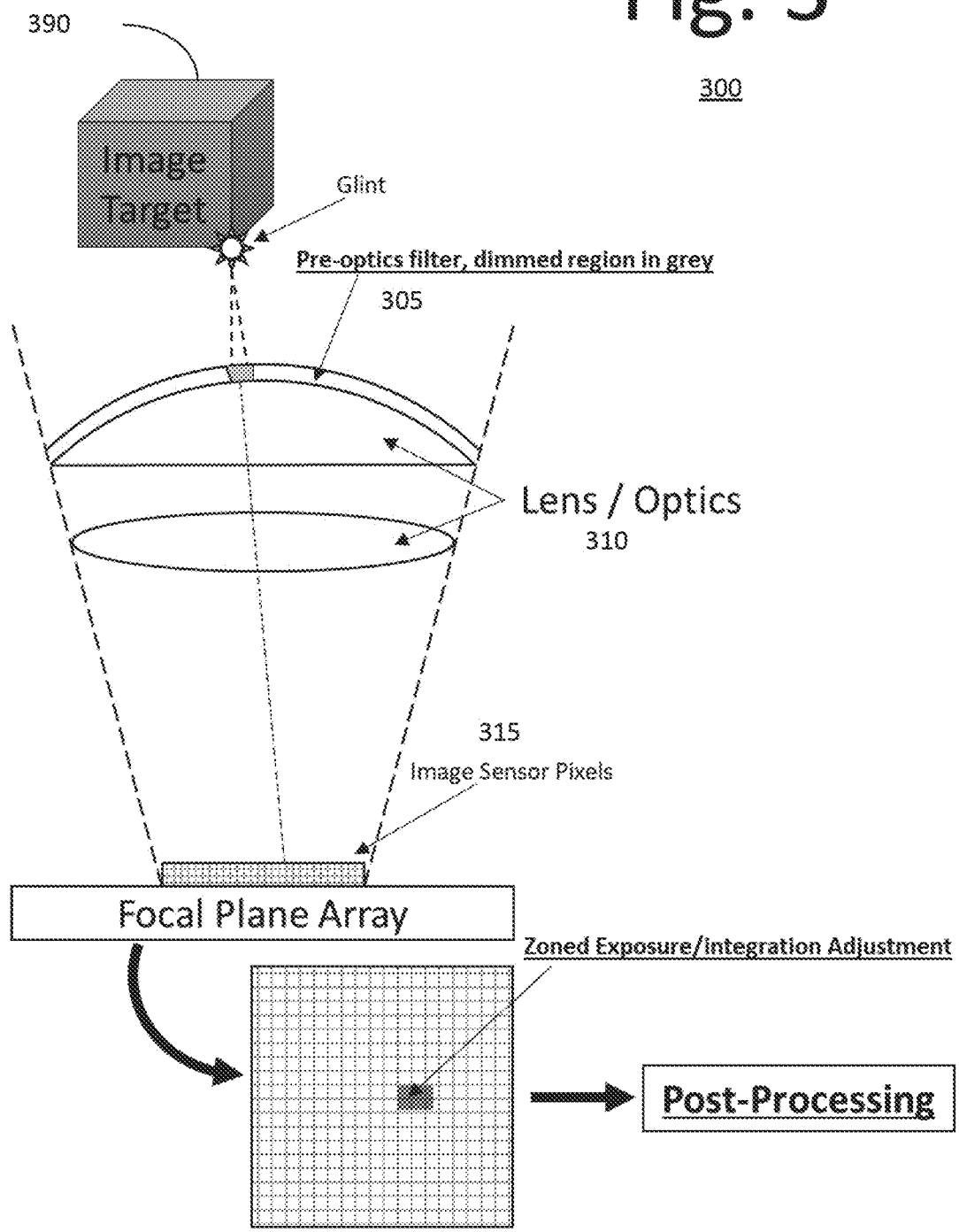
FIG. 3 is a diagram illustrating a system for pixel based anti-glint filtering with a pre-optics filter in front of the lens, dimmed region, according to an embodiment of the present invention.

FIG. 3 is a diagram illustrating a system 300 for pixel based anti-glint filtering, according to an embodiment of the present invention. In FIG. 3, pixel based anti-glint filtering system 300 is oriented towards an image target 390. To augment imaging (e.g., space-based imaging), system 300 includes a pre-optics filter(s) 305 capable of controlled opacity of zones. The zones may range from coarse divisions of optical field of view, to sub-pixel size.

Figure 4:
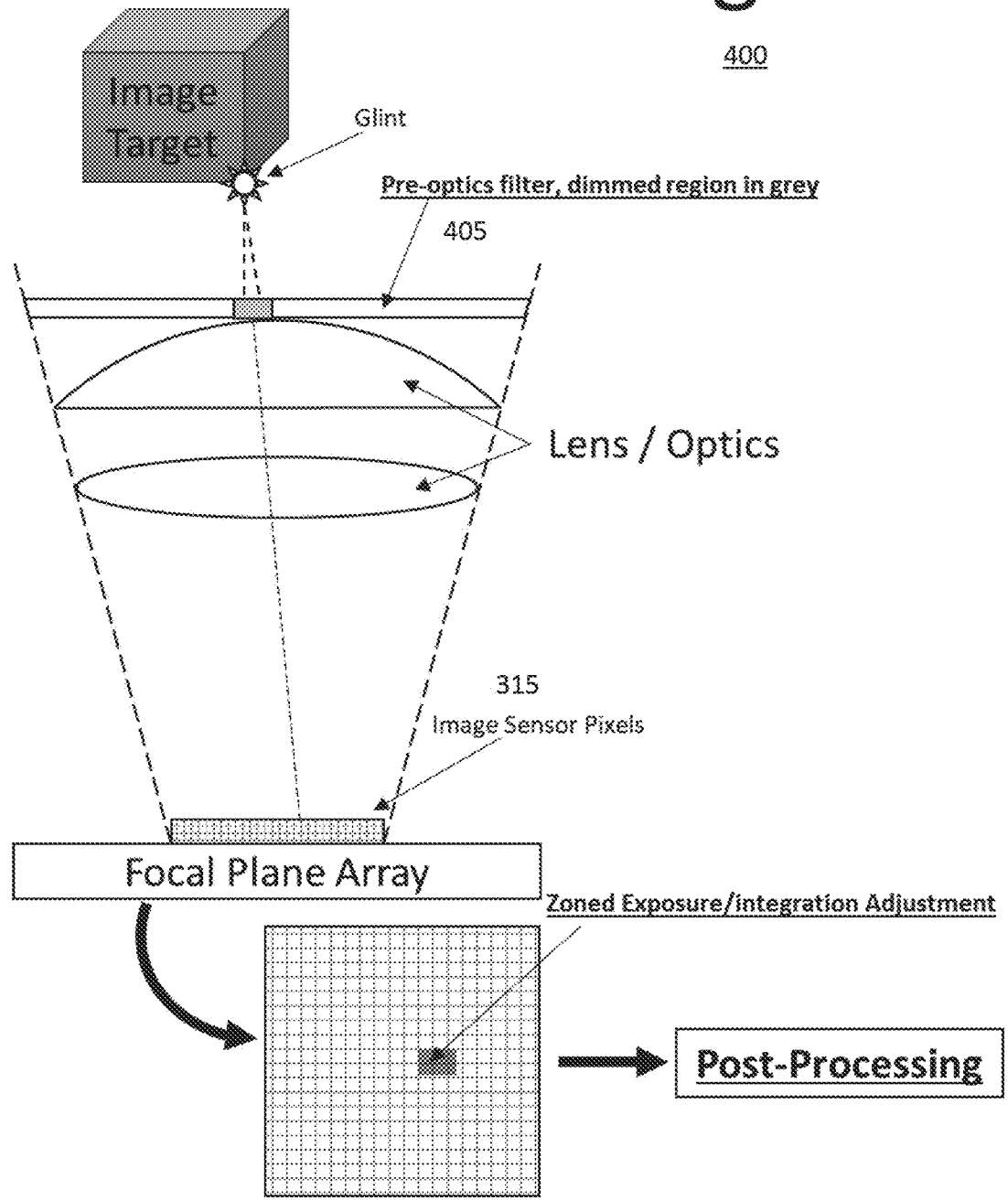
FIG. 4 is a diagram illustrating a system for pixel based anti-glint filtering with a pre-optics filter in front of the lens, dimmed region, according to an embodiment of the present invention.
Figure 5:
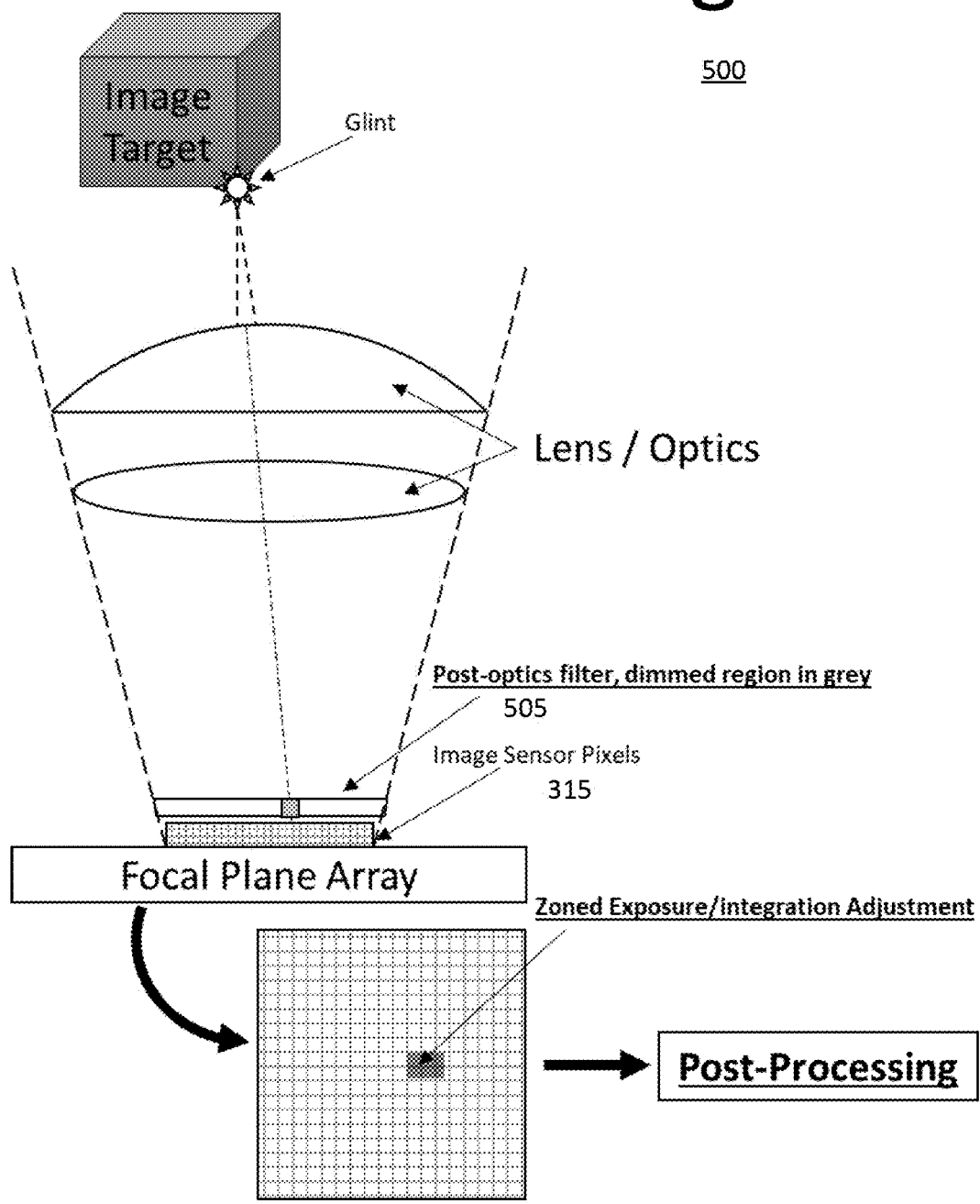
FIG. 5 is a diagram illustrating a system for pixel based anti-glint filtering with a pre-optics filter in front of image sensor pixels, according to an embodiment of the present invention.

As shown in FIG. 3, pre-optics filter 305 is applied to lens/optics 310. In other embodiments, however, pre-optics filter 405 may be applied in front of lens/optics 310 (see FIG. 4) or a post-optic filter 505 may be applied after the lens/optics 310 but before the image sensor 315 (see FIG. 5). In some embodiments, a pre-optics filter is used to provide zoned dimming, preventing incoming light sources from overwhelming imaging sensors and/or the processes used to adjust exposure or integration time for imaging sensors exposed to this light. By doing so, the pre-optics filter prevents glint, or other extreme local brightness, from impacting the image quality of an entire image captured by the system. A post-optics filter may also be used to perform an equivalent function. Placement of such a filter pre- or post-optics may have implications on the thermal behavior of the system, or other phenomena related to the absorption of energy from incoming light in order to reduce glint, with different configurations of such a system having reason to select one or both strategies depending on the imaging system's needs and application.

A zoned pre-optics filter may respond to localized brightness or glint, either detected directly by the filter, by an algorithm monitoring image characteristics, by an external sensor, or by other means, by changing opacity, or dimming incoming light in a region to prevent the imaging system from otherwise being over exposed to this local brightness or glint. By doing so, the pre-optics filter constrains the impacts from the local brightness or glint to the zoned region.

A focal plane array is a collection of sensors with outputs which in aggregate forms an image or imagery product.

Returning to FIG. 3, with post-processing, system 300 may include an augmented exposure algorithm implemented in zones or per-pixel on imaging hardware. The algorithm may adjust local exposure to avoid saturation and loss of data quality. The algorithm may also inform neighboring zones to preemptively adjust exposure. The adjustments and informing may be accomplished by using event camera devices, for example.

In various embodiments, the algorithm is located within the imaging sensor hardware, in vehicle hardware using the imaging system, or in off-board or ground-based hardware able to receive and respond to events at timescales sufficient for the particular application of the imaging system and its environment.

System 300 may further include a device for post-processing of imagery utilizing the knowledge from the pre-optic filter. For example, knowledge from the filter is used to reproduce the unfiltered input, and sources of glint may be used to correct lens flare effects.

In the system depicted in FIG. 3, a pre-optics filter responds to localized brightness due to glint from an object within its image FOV by generating a dimmed zone. This dimmed zone prevents the glint from causing overexposure and loss of image data in the region of the glint, or prevents an autoexposure algorithm on the system from adjusting the exposure in a manner that produces an image with poor signal-to-noise ratios. In doing so, the dimmed zone results in an image from the focal plane array which has dim region relative to the true scene. A post-processing algorithm is used to assess the amount of dimming applied by the pre-optics filter's response and adjust the image to counteract this effect—thereby producing a high quality and consistent image across the entire focal plane array. In another embodiment, the state of the pre-optics filter is captured and transmitted along with the image for off-board post-processing or reconstruction of the image.

Figure 6:
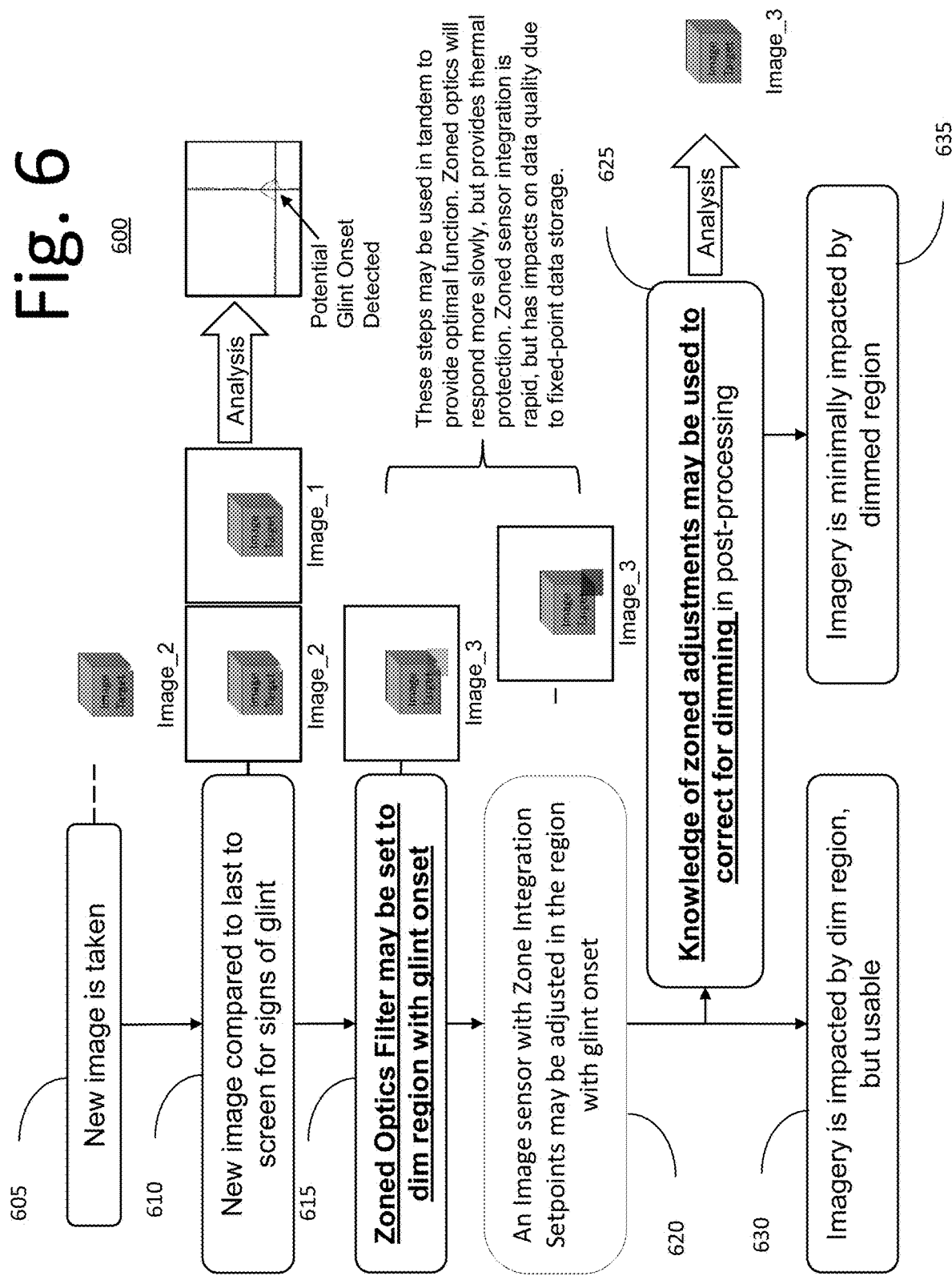
FIG. 6 is a flow diagram illustrating a method for per-pixel anti-glint filtering, according to an embodiment of the present invention.

FIG. 6 is a flow diagram illustrating a method 600 for per-pixel anti-glint filtering, according to an embodiment of the present invention. In some embodiments, method 600 includes, at 605, capturing a new image by a camera on a space vehicle. At 610, method 600 includes comparing the new image with a previously captured image for identifying signs of glint. At 615, method 600 includes setting a zoned optics filter to dim a region with glint onset. In certain embodiments, zoned dimming is accomplished by use of an electrochromic device (this is similar to the technology used to automatically dim rearview mirrors in modern cars). A grid, or layered and/or woven array of electrochromic materials may be used to achieve zoned dimming. With each electrochromic grid element, or strip in the case of a woven array, actuated separately a known dimming effect may be applied to counteract the localized brightness from a source of glint.

At 620, method 600 includes adjusting an image sensor with zoned integration setpoints in a region with glint onset. In some embodiments, steps 615 and 620 may be used in tandem to provide optimal function. Zoned optics may respond slowly, and may provide thermal protection. Zoned sensor integration is rapid but has impacts on data quality due to fixed-point data storage.

Figure 7:
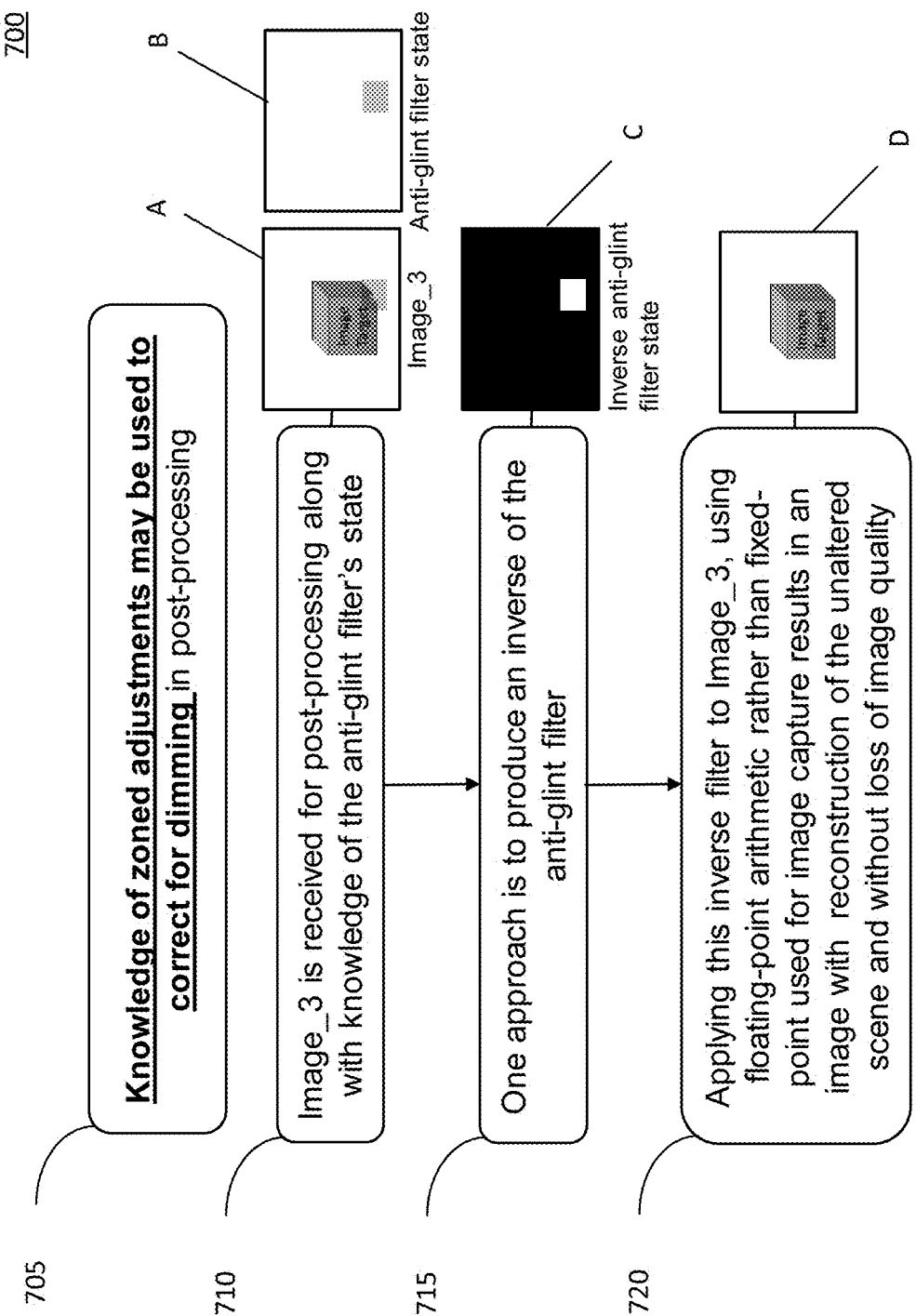
FIG. 7 is a flow diagram illustrating a method for performing post-processing, according to an embodiment of the present invention.

At 625, method 600 includes using the knowledge of the zoned adjustments to correct for dimming in the post-processing steps. FIG. 7 is a flow diagram illustrating a method 700 for performing post-processing, according to an embodiment of the present invention. In some embodiment, method 700 includes using a knowledge of the zoned adjustments to correct for dimming at 705. Knowledge of the zoned adjustments may include the image and the state of the pre-pixel filter (PPF) or pixel gain map for the image. For instance, if the PPF has a region that has been dimmed 50% that knowledge could be used to brighten the dimmed region in post-process while clipping the glint effects thereby improving the overall imagery quality. The post-processing brightening may also be performed in floating, rather than fixed-point to prevent saturation of pixels with glint. Additionally, if the pixel gains were reduced a similar process could be used to map the gains for the focal plane. By inverting the gain map and clipping the glint effects the imagery could be brightened and improve the overall quality.

At 710, method 700 includes receiving an image (e.g., Image_3) for pos t-processing along with the knowledge of anti-glint filter's state. See before image A and after image B. It should be appreciated that knowledge of anti-glint filter's state means that the user (or algorithm) has all the information necessary to understand how the anti-glint filter has altered the resulting image. This may be as simple as "50% reduction in brightness in this region" or as complicated as a fully dynamic representation of the filter and its impacts across the entire image. At 715, method 700 includes producing an inverse of the anti-glint filter. See, for example, Image C. At 720, method 700 includes applying the inverse of the anti-glint filter (see Image C) to the received image (see Image A) using floating point arithmetic rather than fixed-fee point used for image capture results in an image with reconstruction of the unaltered scene and without loss of image quality. See Image D.

Returning to FIG. 6, at 630, method 600 includes determining that the imagery is impacted by a dimmed region, but usable. At 635, method includes determining that imagery is minimally impacted by dimmed region after post-processing.

Figure 8:
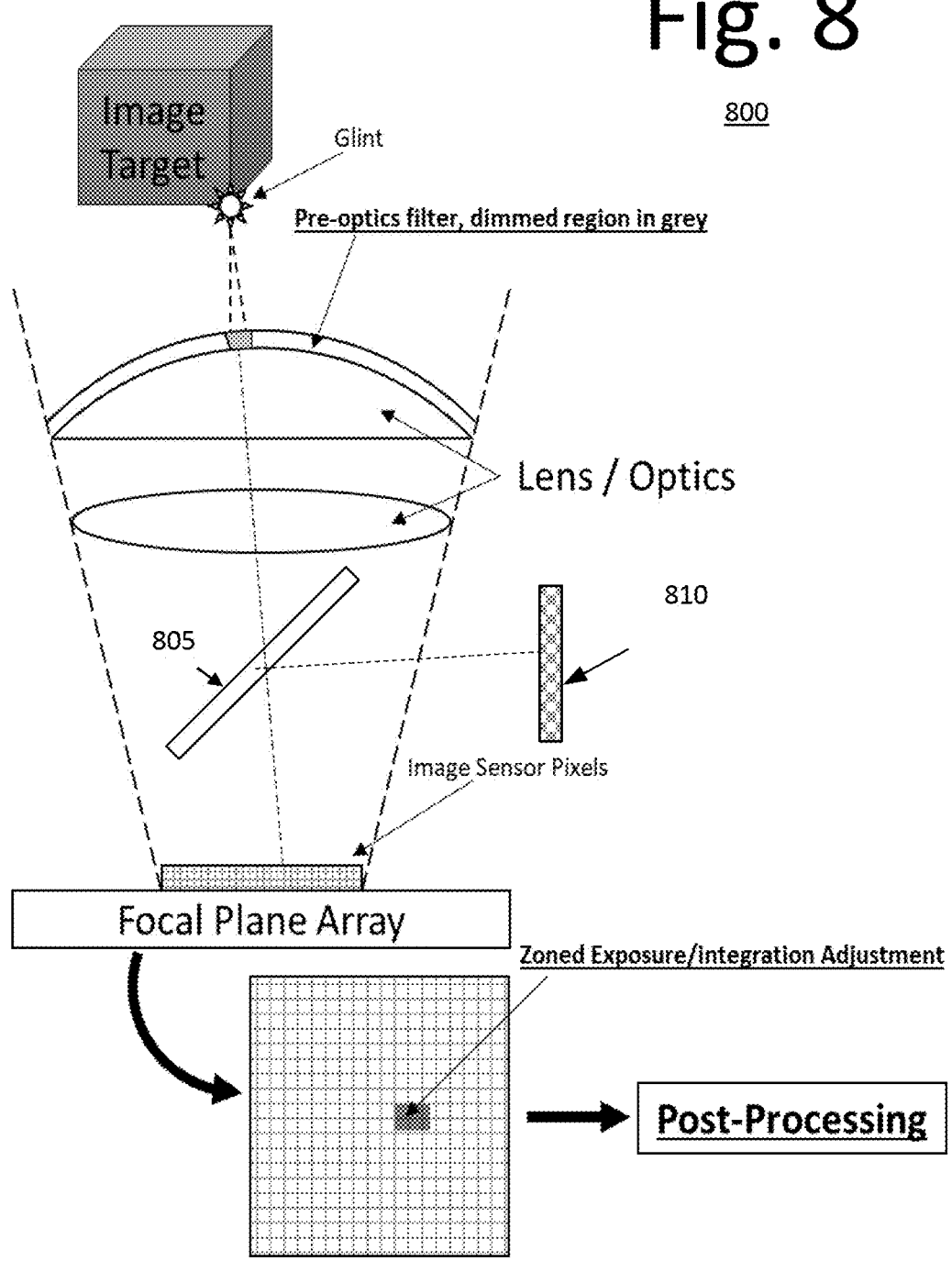
FIGS. 8-10 is a diagram illustrating a system for pixel based anti-glint filtering, according to an embodiment of the present invention.
Figure 9:
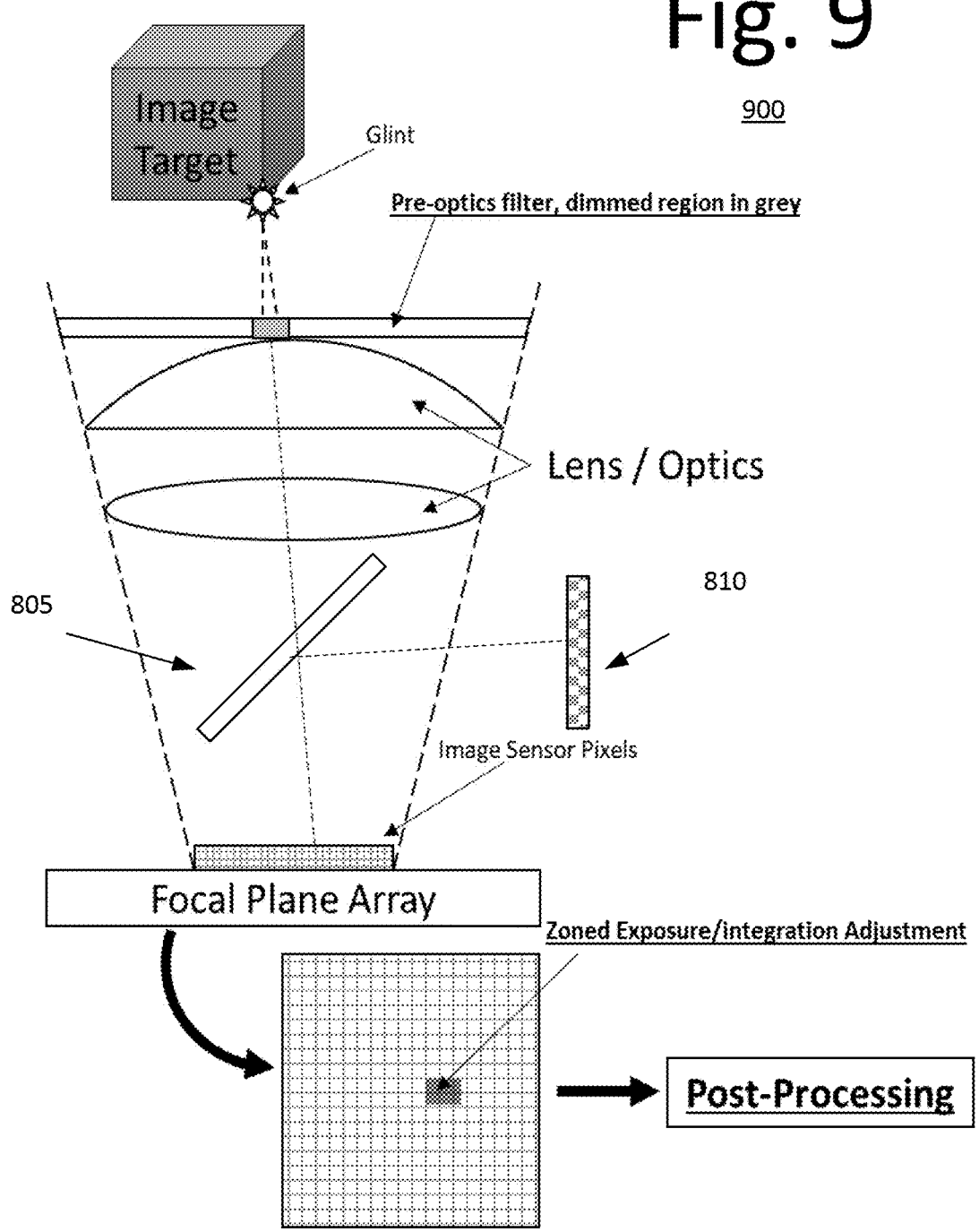
Figure 10:
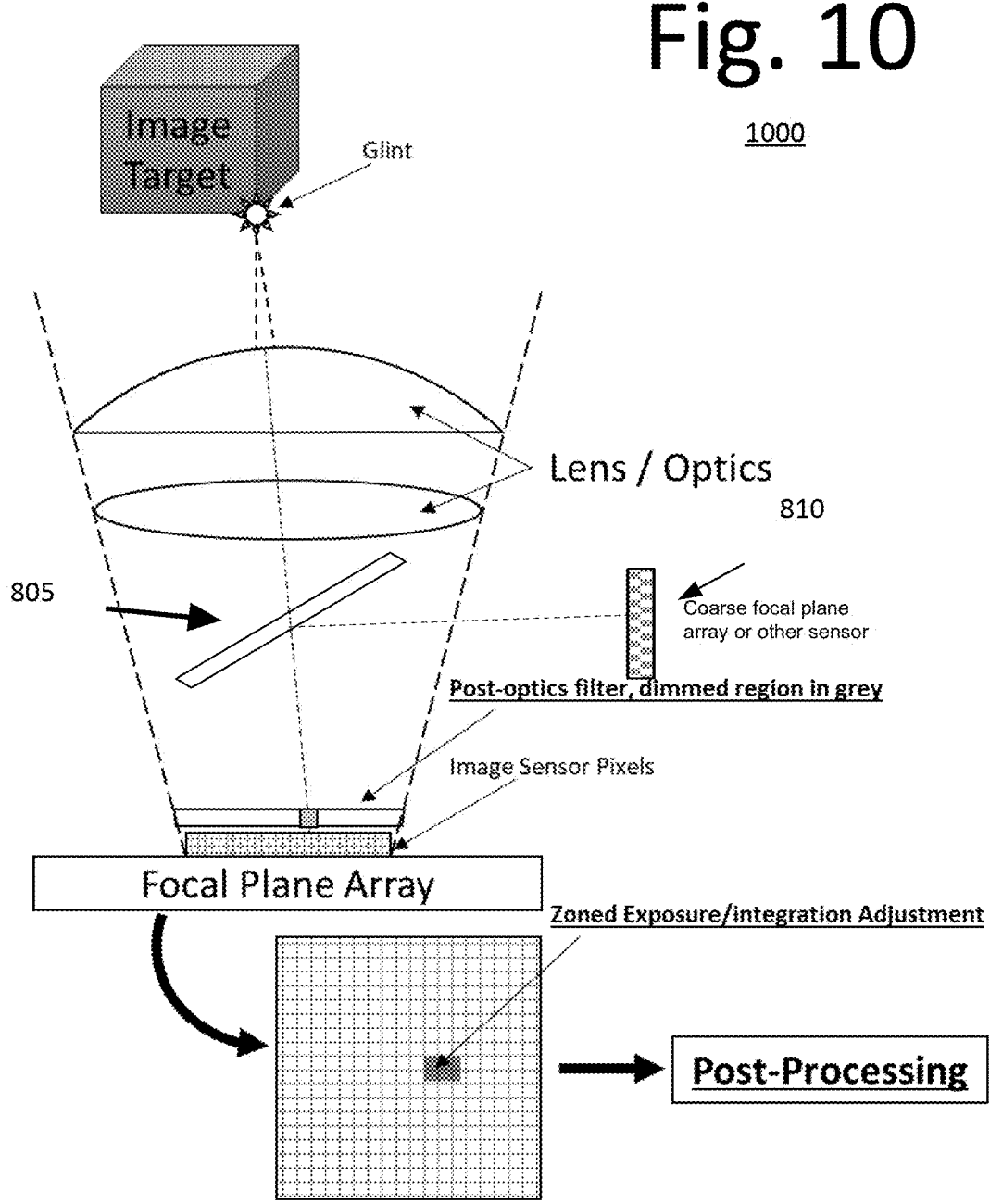

FIGS. 8-10 is a diagram illustrating a system 800-1000 for pixel based anti-glint filtering, according to an embodiment of the present invention. In FIGS. 8-10, systems 800-1000 include a beam splitter (or 2-way mirror) 805 placed in front of image sensor pixels. In some embodiments, beam splitter 805 redirects some of the incoming light to a second detector 810 which is optimized to detect early glint onset. This co-bore sighted device controls the pre-optics filter, or automatic gain control of the pixels of the main focal plane directly. Beam splitter 805 may also include a coarse focal plane array or other sensor 810. Detector 810 may have a greatly reduced number of pixels, and therefore, the processing times for the second detector 810 to determine a glint signature would be greatly reduced.

The process steps performed in FIGS. 1, 2, 6, and 7 may be performed by a computer program, encoding instructions for the processor(s) to perform at least part of the process(es) described in FIGS. 1, 2, 6, and 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system to implement all or part of the process steps described in FIGS. 1, 2, 6, and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computing system, FPGA, an ASIC, or any other suitable device.

Some embodiments address many space-based imaging challenges due to extreme lighting conditions. The conditions may include high contrast between empty space and stars, or between earth terrain and the Earth limb on the horizon; glint in optics from light sources in or out of the optical field of view; and thermal impacts from exposure of camera hardware to direct lighting. Although some embodiments pertain to space-based imaging, one or more embodiments described herein may be applied to imaging related to self-driving vehicles, which use camera systems that are susceptible to glint.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for pixel based anti-glint filtering, the method comprising:
   identifying one or more dimmed pixels in a captured image; and
   adjusting the one or more dimmed pixels to capture a non-dimmed image, wherein
   the adjusting the one or more dimmed pixels comprises performing zoned filtering by shading a single pixel in a pixel array or a portion of the pixel array to reduce an amount of incoming light, and
   the shading of the single pixel or the portion of the pixel array is performed external to a focal plane array.

2. The method of claim 1, wherein the performing the zoned filtering comprising
   limiting of a charge collected from the one or more dimmed pixels, or
   individually adjusting a gain for the one or more dimmed pixels.

3. The method of claim 1, further comprising:
   reconstructing a final image by processing the captured image to generate the non-dimmed image.

4. The method of claim 3, wherein the reconstructing the final image is performed with a single image and knowledge of an applied zoned filter, and/or with an inclusion of previous and future images captured with different or no zoned filtering.

5. The method of claim 1, further comprising:
   comparing a new captured image with a previously captured image for identifying signs of glint;
   setting a zoned optic filter to a dim region with a glint onset;
   adjusting an image sensor with zone integration setpoints in a region with the glint onset; and
   identifying the new captured image as being impacted by a dimmed region or minimally impacted by the dimmed region.

6. The method of claim 5, further comprising:
   using a knowledge of zoned adjustments to correct for dimming in the region with the glint onset.

7. The method of claim 6, wherein the using of the knowledge of the zoned adjustments comprising:
   receiving another new image for post-processing along with the knowledge of an anti-glint filter state;
   producing an inverse of the anti-glint filter state; and
   applying the inverse of the anti-glint filter state to the other new image using a floating point arithmetic.

8. A non-transitory computer-readable medium comprising a computer program for pixel based anti-glint filtering, wherein the computer program is configured to cause at least one processor to execute:
   identifying one or more dimmed pixels in a captured image; and
   adjusting the one or more dimmed pixels to capture a non-dimmed image, wherein
   adjusting the one or more dimmed pixels comprises performing zoned filtering by shading a single pixel in a pixel array or a portion of the pixel array to reduce an amount of incoming light, and
   the shading of the single pixel or the portion of the pixel array is performed external to a focal plane array.

9. The non-transitory computer readable medium of claim 8, wherein the performing the zoned filtering comprising,
   limiting of a charge collected from the one or more dimmed pixels, or
   individually adjusting a gain for the one or more dimmed pixels.

10. The non-transitory computer readable medium of claim 8, further comprising:
    reconstructing a final image by processing the captured image to generate the non-dimmed image.

11. The non-transitory computer readable medium of claim 10, wherein the reconstructing the final image is performed with a single image and knowledge of an applied zoned filter, and/or with an inclusion of previous and future images captured with different or no zoned filtering.

12. The non-transitory computer readable medium of claim 8, further comprising:
    comparing a new captured image with a previously captured image for identifying signs of glint;
    setting a zoned optic filter to a dim region with a glint onset;
    adjusting an image sensor with zone integration setpoints in a region with the glint onset; and
    identifying the new captured image as being impacted by a dimmed region or minimally impacted by the dimmed region.

13. The non-transitory computer readable medium of claim 12, further comprising:
    using a knowledge of zoned adjustments to correct for dimming in the region with the glint onset.

14. The non-transitory computer readable medium of claim 13, wherein the using of the knowledge of the zoned adjustments comprising:
    receiving another new image for post-processing along with the knowledge of an anti-glint filter state;
    producing an inverse of the anti-glint filter state; and
    applying the inverse of the anti-glint filter state to the other new image using a floating point arithmetic.

15. A system configured to perform pixel based anti-glint filtering, the system comprising:
    at least one processor; and
    memory comprising a set of instructions, wherein
    the set of instructions is configured to cause the at least one processor to execute:
    identifying one or more dimmed pixels in a captured image; and
    adjusting the one or more dimmed pixels to capture a non-dimmed image, wherein
    the adjusting the one or more dimmed pixels comprises performing zoned filtering by shading a single pixel in a pixel array or a portion of the pixel array to reduce an amount of incoming light, and
    the shading of the single pixel or the portion of the pixel array is performed external to a focal plane array.

16. The system of claim 15, wherein the set of instructions is further configured to cause the at least one processor to execute:

limiting of a charge collected from the one or more dimmed pixels, or individually adjusting a gain for the one or more dimmed pixels.

17. The system of claim 16, wherein the set of instructions is further configured to cause the at least one processor to execute:

reconstructing a final image by processing the captured image to generate the non-dimmed image.

18. The system of claim 17, wherein the set of instructions is further configured to cause the at least one processor to execute:

performing the reconstructing the final image with a single image and knowledge of an applied zone filter, and/or with an inclusion of previous and future images captured with different or no zoned filtering.

19. The system of claim 15, wherein the set of instructions is further configured to cause the at least one processor to execute:

comparing a new captured image with a previously captured image for identifying signs of glint;

setting a zoned optic filter to a dim region with a glint onset;

adjusting an image sensor with zone integration setpoints in a region with the glint onset; and identifying the new captured image as being impacted by a dimmed region or minimally impacted by the dimmed region.

20. The system of claim 19, wherein the set of instructions is further configured to cause the at least one processor to execute:

using a knowledge of zoned adjustments to correct for dimming in the region with the glint onset.

21. The system of claim 20, wherein the set of instructions is further configured to cause the at least one processor to execute:

receiving another new image for post-processing along with the knowledge of an anti-glint filter state;

producing an inverse of the anti-glint filter state; and applying the inverse of the anti-glint filter state to the other new image using a floating point arithmetic.

* * * * *